United States Patent Office 3,012,535
Patented Dec. 12, 1961

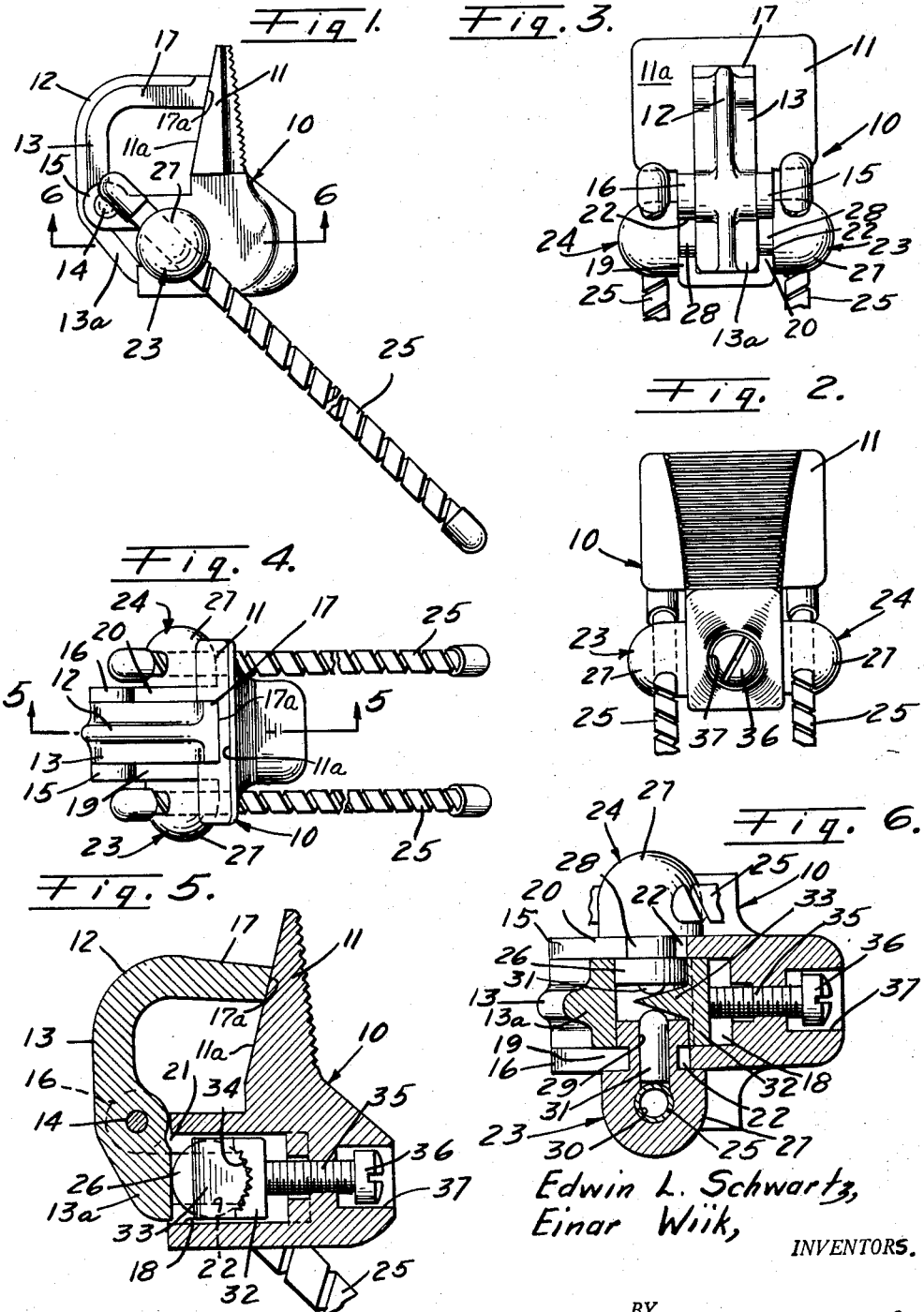

3,012,535
CURB FEELER
Edwin L. Schwartz and Einar Wiik, Los Angeles, Calif., assignors to Sutone Corporation, Los Angeles, Calif., a corporation of California
Filed July 25, 1960, Ser. No. 45,015
7 Claims. (Cl. 116—28)

The present invention relates generally to a curb feeler device or attachment adapted to be positioned on the fender or other suitable part of an automobile for indicating and apparising the operator of the vehicle of the proximity of a curb or other object; and is more particularly concerned with a device of this character having a pair of adjustable feelers which may be independently adjusted for low and high positions.

Heretofore, conventional curb feeler devices of the double feeler type have in the main embodied more or less make shift structures in which one of the feelers may be adjusted for a high position, while the other feeler may be adjusted for a low position. These structures have embodied separate fastening devices for respectively securing the device to the fender or other support, and for separately securing the feelers in their adjusted positions.

Having in mind the conventional arrangements and their more or less complexity of construction the present invention proposes to provide as one object a curb feeler device having double feelers, which is of pleasing appearance, economic of construction and simple of operation.

Another object is to provide in a curb feeler structure unique fastening means wherein the three fastening operations, namely, securing the device to a support, and securing the two feelers in adjusted positions may be accomplished by manually actuating a single member, this member being conveniently located for ready access.

Further objects of the invention will be brought out in the following part of the specification, wherein detail description is for the purpose of fully disclosing the invention without placing limitations thereon.

Referring to the accompanying drawings, which are for illustrative purposes only:

FIG. 1 is a side elevational view of a curb feeler embodying the feature of the herein described invention;

FIG. 2 is a front elevational view of the same with a fragmentary showing of the feelers;

FIG. 3 is a back elevational view with a fragmentary showing of the feelers;

FIG. 4 is a top plan view;

FIG. 5 is an enlarged transverse vertical section taken subtantially on line 5—5 of FIG. 4; and FIG. 6 is an enlarged horizontal section taken substantially on line 6—6 of FIG. 1.

Referring generally to the drawings, the curb feeler structure of the present invention comprises generally a body structure 10 constructed of a suitable material, and preferably of a metal which will not tend to rust or oxidize under weather conditions. This body structure forms a supporting bracket which is arranged to be secured to an automobile fender or other desired portion of the automobile or vehicle so as to place the feelers in such a position as to contact a highway curb when driving or parking an automobile near the edge of the highway or street.

The body structure has an integrally formed projection 11 which extends upwardly therefrom and forms a fixed clamping member. Cooperatively associated with the fixed clamping member is a pivoted clamping member 12 of substantially L-shaped configuration, with a leg portion 13 pivotally supported for rocking movement on a pivot pin 14 supported at its ends on spaced lugs 15 and 16. Another leg portion 17 is cooperatively associated with the fixed clamping member, the extreme end 17a of this leg portion being movable into clamping and non-clamping engagement with the adjacent face 11a of the fixed clamping member so that, when these members are disposed on opposite sides of a fender edge margin, the clamping members may be actuated into clamp position, as will hereinafter be explained in detail, for holding the bracket in mounted position for proper function of the feeler members.

As best shown in FIGS. 5 and 6, the body structure is provided with an internal recess 18 of substantially rectangular cross section, and is horizontally bounded by side walls 19 and 20 respectively which have the lugs 15 and 16 integrally formed therewith. The recess 18 has a rearwardly positioned end opening 21, while the side walls 19 and 20 are provided with a slot 22 in each case which is open at its rearmost end.

Tubular supports 23 and 24 of similar construction project laterally of the body structure 10 from the opposite side thereof to respectively provide an adjustable mounting for a curb feeler 25. The tubular support in each case is fabricated with a disk shaped inner head portion 26 which is positioned within the recess 18. The inner head portion is connected with an outer head portion 27 of substantially semi spherical configuration by means of a contracted inter end portion 28 positioned in the adjacent slot 19 or 20 as the case may be. Each of the tubular supports has a longitudinally extending tubular passage 29 which extends from the innermost end of the support to a transversely extending passage 30 in the outer head portion 27 adapted to receive therethrough one of the feeler members 25 so as to permit longitudinal movement of the feelers therein. Moreover, it will be observed that by virtue of the tubular support being mounted in one of the side wall slots, the tubular support may be located to position the feeler in a desired angular adjusted position.

Means are provided for securing the respective feeler members 25 against longitudinal movement in its associated support by providing in each case a pin member 31 which is positioned in the tubular passage 29 and may be longitudinally moved therein. The innermost ends of the pins 31 of the respective supports 23 and 24 project beyond the innermost heads thereof into the recess 18, these pins having their innermost ends rounded and spaced apart as best shown in FIG. 6.

The actuating mechanism for locking and retaining the pivoted and fixed clamping member of the bracket in clamped relatition, and the feelers 25 in longitudinal and rotational adjusted positions will now be described. As shown in FIGS. 1 and 5, the pivoted leg portion 13 of the clamping member 12 has an extension 13a which projects past the pivot pin 14 to the other side thereof, and is positioned in the opening 21 of the internal recess 18 where it may be engaged by the inner head portions 26—26 of the tubular supports 23 and 24. Diametrically opposite, and lying within the innermost end portion of the recess 18 is a locking block 32 which is constructed with an intermediate projecting wedge portion 33 adapted to extend between and engage the spaced ends of the pins 31—31. It will be observed that the ends of the block 32 project laterally over the inner head portions 26—26 of the tubular supports and are in each case provided with a curved jaw surface 34, as shown in FIG. 5, for engaging the adjacent surface of the inner head portion 26 of the tubular support.

The bottom wall of the recess 18 is apertured to receive an actuating screw 35 therein, this screw having its innermost end positioned within the recess 18 for engaging the adjacent surface of the block 32, while the outermost head portion 36 of the screw is contained within an external recess 37 on the front side of the body 10, where it is easily accessible for actuation by a screw driver.

The screw 35 provides a single manually operable member for locking the feelers in adjusted position and clamping the bracket to the fender or other support. Upon actuating the screw 35 in a tightening direction, the locking block 32 will be advanced toward the open end of the recess 18. This movement functions to initially move the wedge portion 33 further between the ends of the pins 31—31, whereupon the pins are forced outwardly so as to clampingly engage and hold the associated feeler members 25. This clamping action with respect to the feelers is so arranged as to take place substantially at the same time that the curved jaw surfaces of the locking block 32 are moved into clamping engagement with the inner head portions 26—26 of the tubular supports, which are moved along the associated slots 22 of the side walls so as to forcibly engage the end 13a of the pivoted clamping member into clamping position. In the clamped position of the clamping members on the fender or other support, the jaw surfaces 34—34 of the locking block 32 will clampingly hold the tubular supports 23 and 24 against rotation.

Various modifications may suggest themselves to those skilled in the art without departing from the spirit of our invention, and, hence, we do not wish to be restricted to the specific form shown or uses mentioned except to the extent indicated in the appended claims.

We claim:

1. A curb feeler, comprising: a bracket having gripping means for engaging a support; an elongate feeler; a member rotatably mounted on said bracket and supporting said feeler for longitudinal adjustable movement therein, rotation of said member acting to vary the angular position of said feeler with respect to said bracket; a pin supported in said member for longitudinal reciprocable movement on its axis of rotation, one end of said pin bearing against said feeler and the other end of said pin projecting from the member; and means operable by a single actuating member for moving said gripping means into a gripping position, pressing said pin against said feeler, and holding said member against rotation.

2. A curb feeler, comprising; a bracket having gripping means for engaging a support; a plurality of elongate feelers; means supporting said feelers on said bracket for respective independent movements axially and angularly to positions of adjustment; and means operable by a single actuating member for moving said gripping means into gripping position, and for securing each of said feelers in its axial and angular positions of adjustment.

3. A curb feeler, comprising: bracket means including a body part having a fixed clamping member and a pivoted clamping member movable into cooperative gripping and non-gripping positions with respect to said fixed clamping member; a pair of feeler members; means for supporting said feeler members respectively on opposite sides of said body part for longitudinal and angular adjustments; and means for simultaneously moving said clamping members into gripping positions, and securing said feeler members in adjusted positions, including a single manually operable actuator member carried by said body part between said feelers.

4. A curb feeler, comprising: bracket means including a body part having a fixed clamping member and a pivoted clamping member movable into cooperative gripping and non-gripping positions with respect to said fixed clamping member; a pair of tubular supports having outer ends extending laterally beyond opposite sides of said body; means mounting said supports in axial alignment, for rotational movement and lateral movement to actuate the clamping members; feelers respectively at the outer ends of said supports longitudinally adjustable therein and rotatable therewith; reciprocable members respectively in said tubular supports having outer ends bearing against the adjacent feeler, said reciprocable members having their inner ends spaced apart; and means for simultaneously moving said tubular supports laterally to actuate said clamping members to gripping position, and move said inner ends apart to secure said feelers in adjusted positions.

5. A curb feeler, comprising: a bracket body having a fixed clamping part; a part pivoted on said body for movement into cooperative clamping and non-clamping engagement with said fixed part; axially aligned supports projecting from opposite sides of said body and being supported thereon for rotation and lateral movement against said pivoted part to move it towards clamping engagement with the fixed part, each of said supports having a tubular passage extending from its innermost end to a transverse passage adjacent its outermost end; an elongate feeler member mounted for longitudinal adjusting movement in each of said transverse passages; pin reciprocably mounted in each of said tubular passages with their outer ends adapted to bear against the associated feeler member, and their innermost ends spaced apart; and manually movable means having portions for engaging and simultaneously moving said supports laterally against said pivoted part to effect clamping movement thereof, and a wedge portion between the innermost ends of said pins acting to move then outwardly to retain said feeler members against movement.

6. A curb feeler, comprising: a bracket body having a fixed clamping part; a part pivoted on said body for movement into cooperative clamping and non-clamping engagement with said fixed parts; axially aligned supports projecting from opposite sides of said body and being supported therein for rotation and lateral movement against said pivoted part to move it towards clamping engagement with the fixed part, each of said supports having a tubular passage extending from its innermost end to a transverse passage adjacent its outermost end; an elongate feeler member mounted for limited adjusting movement in each of transverse passages; pins reciprocably mounted in each of said tubular passages with their outer ends adapted to bear against the associated feeler member, and their innermost ends spaced apart; a block member slidably mounted on said body having end portions respectively engaging the innermost ends of said supports, and a wedge portion extending between and engaging the innermost ends of said pins; and manually operable means for sliding said block against the supports to move the supports and actuate said pivoted part and retain the support against rotation, with the wedge portion acting to move the innermost ends of said pins outwardly so as to hold the feeler members against longitudinal movement.

7. A curb feeler, comprising: a bracket body having a fixed clamping part; a part pivoted on said body for movement into cooperative clamping and non-clamping relation with said fixed parts; axially aligned supports projecting from opposite sides of said body and being supported therein for rotation and lateral movement against said pivoted part to move it toward clamping relation with the fixed part, each of said supports having a tubular passage extending from its innermost end to a transverse passage adjacent its outermost end; an elongate feeler member mounted for longitudinal adjusting movement in each of said transverse passages; pins reciprocably mounted in each of said tubular passages with their outer ends adapted to bear against the associated feeler member, and their innermost ends spaced apart; a block member slidably mounted on said body having end portions respectively engaging the innermost ends of said supports, and a wedge portion extending between and engaging the innermost ends of said pins; and a manually operable screw member for forcibly sliding said block against the supports so as to actuate said pivoted part and retain the supports against rotation, the wedge portion acting to move the innermost ends of said pins outwardly so as to hold the feeler members against longitudinal movement.

References Cited in the file of this patent
UNITED STATES PATENTS

| | | |
|---|---|---|
| D. 185,845 | Frees | Aug. 11, 1959 |
| 2,731,935 | Aves | Jan. 24, 1956 |
| 2,749,875 | Frees | June 12, 1956 |